US009954467B1

United States Patent
Kwon et al.

(10) Patent No.: US 9,954,467 B1
(45) Date of Patent: Apr. 24, 2018

(54) MOTOR CONTROL DEVICE CONTROLLING SEVERAL MOTORS INDEPENDENTLY

(71) Applicant: HANSA Co., Ltd., Gunpo-si, Gyeonggi-do (KR)

(72) Inventors: Yong-Gil Kwon, Anyang-si (KR); Takamitsu Ishii, Nakma (JP)

(73) Assignee: HANSA Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/659,754

(22) Filed: Jul. 26, 2017

(30) Foreign Application Priority Data

Mar. 10, 2017 (KR) ........................ 10-2017-0030445

(51) Int. Cl.
*B60W 20/00* (2016.01)
*H02P 5/74* (2006.01)
*H02P 27/06* (2006.01)

(52) U.S. Cl.
CPC ................ *H02P 5/74* (2013.01); *H02P 27/06* (2013.01)

(58) Field of Classification Search
CPC ......... B60W 20/00; B60W 30/14; H02P 6/16; H02P 6/04; H02P 5/74
See application file for complete search history.

(56) References Cited

U.S. PATENT DOCUMENTS

| 5,184,057 A * | 2/1993 | Sakai ................ H02M 5/4585 318/801 |
| 5,712,540 A * | 1/1998 | Toda .................... F24F 11/0009 318/34 |
| 2005/0055120 A1* | 3/2005 | Becker ................ G05B 19/406 700/108 |
| 2006/0090533 A1* | 5/2006 | Fujibayashi ........... B21D 24/02 72/351 |

(Continued)

FOREIGN PATENT DOCUMENTS

| KR | 10-0665059 B1 | 1/2007 |
| KR | 10-0718232 B1 | 5/2007 |
| KR | 10-2012-0071161 A | 7/2012 |

OTHER PUBLICATIONS

Smartmotor Numeric Control, Animatics Corporation, SMNCUM 0016 (rev. 1/02), 2002, 37 pages.

(Continued)

*Primary Examiner* — Shawki S Ismail
*Assistant Examiner* — Muhammad S Islam
(74) *Attorney, Agent, or Firm* — Sughrue Mion, PLLC (57) ABSTRACT

Provided is a motor control device controlling several motors independently. The motor control device includes a plurality of inverters supplying power to each of several motors, respectively, and a control CPU provided with a command generator generating a control command, a PI controller that generates a torque command and a speed command by performing a proportional integral operation using feedback information and the control command transmitted from the command generator, and a vector controller (Continued)

that generates a PWM control signal using the torque command and the speed command and supplies the generated PWM signal to the plurality of inverters, in which the command generator includes an input translator that converts the command input as a QMCL command into the control command.

12 Claims, 6 Drawing Sheets

(56) References Cited

U.S. PATENT DOCUMENTS

| | | | | |
|---|---|---|---|---|
| 2007/0138986 A1* | 6/2007 | Kutsuna | ............ | B60K 6/365 |
| | | | | 318/400.21 |
| 2010/0076612 A1* | 3/2010 | Robertson | ......... | H02M 5/4505 |
| | | | | 700/286 |
| 2014/0225536 A1* | 8/2014 | Yamada | ............ | B60L 15/02 |
| | | | | 318/51 |
| 2015/0381101 A1* | 12/2015 | Odaka | ............ | H02P 29/68 |
| | | | | 318/472 |
| 2016/0094163 A1* | 3/2016 | Takahashi | ......... | H02P 27/08 |
| | | | | 318/400.06 |
| 2016/0254771 A1* | 9/2016 | Qiao | ............ | H02P 21/30 |
| | | | | 318/400.02 |

OTHER PUBLICATIONS

Notice of Preliminary Rejection of Korean Patent Application No. 10-2017-0030445, dated Apr. 18, 2017, English Translation.

* cited by examiner

MOTOR CONTROL DEVICE CONTROLLING SEVERAL MOTORS INDEPENDENTLY

TECHNICAL FIELD

The present invention relates to a motor control device and more particularly, to a motor control device capable of simultaneously controlling several motors independently.

BACKGROUND ART

A motor is a device that generates torque by using electromagnetic induction law and widely used as a driving means in most industrial fields such as robots, electric vehicles, industrial machines, and household applications.

The performance of a motor is generally divided into rotation speed and torque, and a motor controller is used to control the rotation speed and/or the torque in real time when operation speed of the device and/or the load are not constant.

A control method of the motor controller is divided into a variable voltage variable frequency (VVVF) control, a sensorless vector control, and a sensor feedback vector control, etc. In the fields requiring precise control such as robots, electric vehicles, and precision machines, the sensor feedback vector control has been generally applied.

The motor controller is generally used for each motor, and even in a device using several motors such as a multi-axis machine and a multi-axis robot, in many cases, a separate motor controller is connected to each motor and a main controller of the device is configured to transmit a control command for each motor controller.

However, in the multi-axis machine and the multi-axis robot, when the motor and the motor controller are installed one to one, the number of motor controllers increases, and thus, manufacturing costs increase and an installation space of the motor controllers needs to be ensured and thus, it is difficult to downsize the device.

Accordingly, a technology of individually controlling several motors by one motor controller has been developed recently. For example, Korean Patent No. 10-0665059 (patent 1) and No. 10-0718232 (patent 2) disclose a technology of branching a plurality of inverters (motor drivers) supplying power to each motor from one power supply source and controlling the plurality of inverters (motor drivers) by one motor controller, respectively.

However, when several motors are controlled by one motor controller, it is necessary to accurately control the operation of each motor in real time. Particularly, in the case of installing a separate motor for each drive wheel, such as an independent-drive electric vehicle, casualties may occur when a malfunction occurs, and thus, high control reliability is required.

The patent 1 and 2 above disclosed technology of enhancing control reliability by preventing noise due to interference between the inverters. However, by only the technology, it is difficult to implement a target speed stably under a severe condition in which an operation load is changed in real time and control to exhibit stable torque over a wide speed range.

Accordingly, in a field of an independent-drive electric vehicle, a multi-axis precision machine, and a multi-axis robot that simultaneously drive several motors to perform specific operations, it is necessary to develop a more precise control technique capable of exhibiting a stable torque over a range while controlling several motors by a single motor controller.

Meanwhile, researchers or developers of electric vehicles, multi-axis robots, multi-axis machine tools, and the like test the speed and torque of the motor while varying the control parameters of the motor controller during research and development. But, there are many difficulties in modifying or adding the control parameters, because most of the researchers are not familiar with the program installed on the motor controller, In particular, since the control program installed in the motor controller corresponds to the trade secret of the manufacturer, in most cases, the control parameters are set by the manufacturer according to the request of the user. As a result, it is practically impossible to test the performance of the motor in various fields while variously changing the control parameters.

Therefore, there is a need to develop a motor controller that allows motor users or related researchers to more easily set or add the control parameters.

DISCLOSURE

Technical Problem

The present invention is contrived to solve the above problems and has been made in an effort to provide a new motor control technology capable of exhibiting stabilized performance even while several motors are controlled independently. Further, the present invention has been made in an effort to provide a user interface that motor users or researchers may more conveniently set control parameters.

Technical Solution

In order to solve the objects, an aspect of the present invention provides a motor control device controlling several motors independently, the motor control device including: a plurality of inverters supplying power to each of several motors, respectively; and a control CPU provided with a command generator generating a control command, a PI controller that generates a torque command and a speed command by performing a proportional integral operation using feedback information and the control command transmitted from the command generator, and a vector controller that generates a PWM control signal using the torque command and the speed command and supplies the generated PWM signal to the plurality of inverters, in which the PI controller calculates a torque correction reference value A for each of several motors by using the following Equation, does not correct the torque command when the torque correction reference value A is larger than a previous torque command value, and corrects the torque command when the torque correction reference value A is smaller than or equal to the previous torque command value.

$$A = \frac{K_i}{C_1} e(t) + \frac{K_p}{C_2} \sum_0^t e(t)$$

($K_i$: integral gain, $K_p$: proportional gain, $C_1$, $C_2$: constant, e(t): speed deviation of motor, $\Sigma e(t)$: accumulated speed deviation of motor)

In this case, the accumulated speed deviation may be calculated by using the following Equation, and in the case that the torque correction reference value A is smaller than or equal to the previous torque command value, the PI controller does not correct the torque command when the accumulated speed deviation is larger than the previous torque command value, and corrects the torque command when the accumulated speed deviation is smaller than or equal to the previous torque command value.

$$\sum_0^t e(t) = \sum_0^{t-1} e(t) + \frac{e(t)}{\text{Integral time constant}}$$

Another aspect of the present invention provides a motor control device controlling several motors independently, the motor control device including: a plurality of inverters supplying power to each of several motors, respectively; and a control CPU provided with a command generator generating a control command, a PI controller that generates a torque command and a speed command by performing a proportional integral operation using feedback information and the control command transmitted from the command generator, and a vector controller that generates a PWM control signal using the torque command and the speed command and supplies the generated PWM signal to the plurality of inverters, in which the PI controller corrects the speed command by using a slip correction value B1 calculated by using a product of a slip value $S_{maxL}$ of each motor in a maximum load at a rated frequency $f_R$ and a rising slip value $S_{HIGH}$ of each motor when the feedback frequency is larger than the rated frequency $f_R$ in the case that a feedback frequency $f_F(t)$ of each motor is larger than the rated frequency $f_R$ of the motor. In this case, the slip correction value B1 may be calculated by using the following Equation.

$$B_1 = \frac{1}{C_3}\left(S_{maxL} \times S_{HIGH} \times \frac{f_F(t) - f_R}{f_F(t)}\right) + S_{maxL}$$

($S_{maxL}$: slip value of motor in maximum load at rated frequency $f_R$, $S_{HIGH}$: rising slip value when feedback frequency of motor is larger than rated frequency $f_R$, $C_3$: constant)

Yet another aspect of the present invention provides a motor control device controlling several motors independently, the motor control device including: a plurality of inverters supplying power to each of several motors, respectively; and a control CPU provided with a command generator generating a control command, a PI controller that generates a torque command and a speed command by performing a proportional integral operation using feedback information and the control command transmitted from the command generator, and a vector controller that generates a PWM control signal using the torque command and the speed command and supplies the generated PWM signal to the plurality of inverters, in which the PI controller calculates a slip correction value B2 by using a slip value $S_{maxL}$ of each motor in a maximum load at a rated frequency $f_R$ and a slip value So of each motor when the motor is stopped while power is supplied, in the case that a feedback frequency $f_F(t)$ of several motors is smaller than or equal to the rated frequency $f_R$ of the motor, wherein the PI controller corrects the speed command by using the slip correction value B2 when the slip correction value B2 is smaller than or equal to the maximum slip value of the motor and corrects the speed command by using the maximum slip value when the slip correction value B2 is larger than the maximum slip value of the motor. In this case, the slip correction value B2 may be calculated by using the following Equation.

$$B_2 = \frac{S_{maxL}}{C_4} \times \left\{(C_5 - So) \times \frac{f_F(t)}{f_R} + So\right\}$$

(So: slip value when motor is stopped while power is supplied, $C_4$, $C_5$: constants)

In the motor control device according to the present invention, the command generator may include an input translator that converts the input command into the control command. Further, in the motor control device according to the present invention, the feedback information may include output current information of each inverter and speed information calculated by a differential controller by using a pulse generated in the pulse generator mounted on the motor.

Advantageous Effects

According to the present invention, it is possible to control the motor to exhibit stable torque at a predetermined speed by correcting a previous torque command value by using speed information of the motor. And it is possible to control the motor speed stably even when the motor operates at a high speed or requires large torque by correcting a speed command using a slip value of the motor.

Further, since motor users or researchers may more conveniently set and change parameters for motor control by using a user-friendly QMCL command, there is an advantage in facilitating motor-related research and development.

MODES OF THE INVENTION

Hereinafter, preferable exemplary embodiments of the present invention will be described in detail with reference to the accompanying drawings.

For reference, in the present specification, when an element is connected, coupled, or electrically connected to another element, an element is directly connected, coupled, or electrically connected to other elements, or indirectly connected, coupled, or electrically connected with other elements with another element interposed therebetween.

Further, when an element is directly connected, coupled, or electrically connected to other elements, it means that no other element is interposed therebetween. Further, a meaning that any part includes or provides any element does not exclude other elements unless specifically stated otherwise, but may further include or provide other elements.

Figure 1:
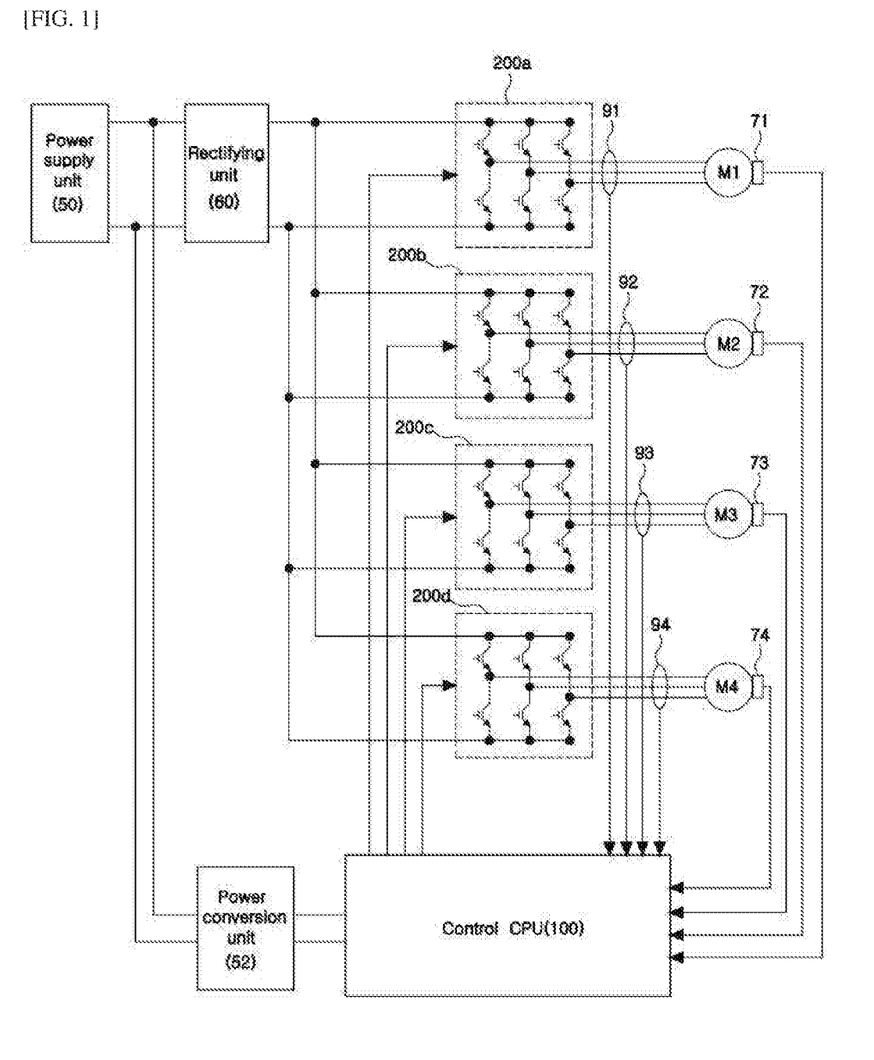
FIG. 1 is a diagram illustrating a configuration of a motor control device according to an exemplary embodiment of the present invention.

As illustrated in a configuration diagram of FIG. 1, a motor control device according to an exemplary embodiment of the present invention includes a power supply unit 50, a rectifying unit 60, first to fourth inverters 200a, 200b, 200c, and 200d for supplying driving power to the first to fourth motors M1, M2, M3, and M4, respectively, first to fourth pulse generators (P/G) 71, 72, 73, and 74 mounted in the respective motors M1, M2, M3, and M4 for detecting a rotation speed, first to fourth current sensors 91, 92, 93, and 94 for detecting the output current of the respective inverters 200a, 200b, 200c, and 200d, a control CPU 100, and the like.

The power supply unit 50 is generally a battery, a solar cell, and the like, but may be AC power. The rectifying unit 60 may stabilize and/or smooth DC power when the power supply unit 50 outputs DC power or convert the AC power to the DC power when the power supply unit 50 outputs AC power.

In the drawing, it is illustrated that the motor control device controls four motors M1, M2, M3, and M4, but since the present invention relates to a motor control device that individually controls two or more motors, of course, the number of motors is not limited thereto.

The first to fourth inverters 200a, 200b, 200c, and 200d serve to convert DC output from the rectifying unit 60 to AC for driving the motor by using a plurality of switching elements (FET, IGBT, and etc.). The power of the power supply unit 50 is also supplied to the control CPU 100 through a power conversion unit 52.

A PWM signal generated in the control CPU 100 is input to a gate terminal or a base terminal of a plurality of switching elements configuring each of the inverters 200a, 200b, 200c, and 200d.

The control CPU 100 controls independently the respective motors M1, M2, M3, and M4 by using a sensor feed-back vector control program.

The control CPU 100 controls the speed and the torque of each of the motors M1, M2, M3, and M4 by controlling the output of each of the inverters 200a, 200b, 200c, and 200d by using set or inputted parameters, detection values of the first to fourth pulse generators 71, 72, 73, and 74, detection values of the first to fourth current sensors 91, 92, 93, and 94, and the like. Particularly, the control CPU 100 controls the speed and the torque of each of the motors M1, M2, M3, and M4 by controlling the output of each of the inverters 200a, 200b, 200c, and 200d by adjusting the frequency, the duty ratio, and the like of the PWM signal output.

The pulse generators 71, 72, 73, and 74 detect rotation speeds, rotation angles, and the like of the respective motors M1, M2, M3, and M4 and for example, may be encoders.

Figure 2:
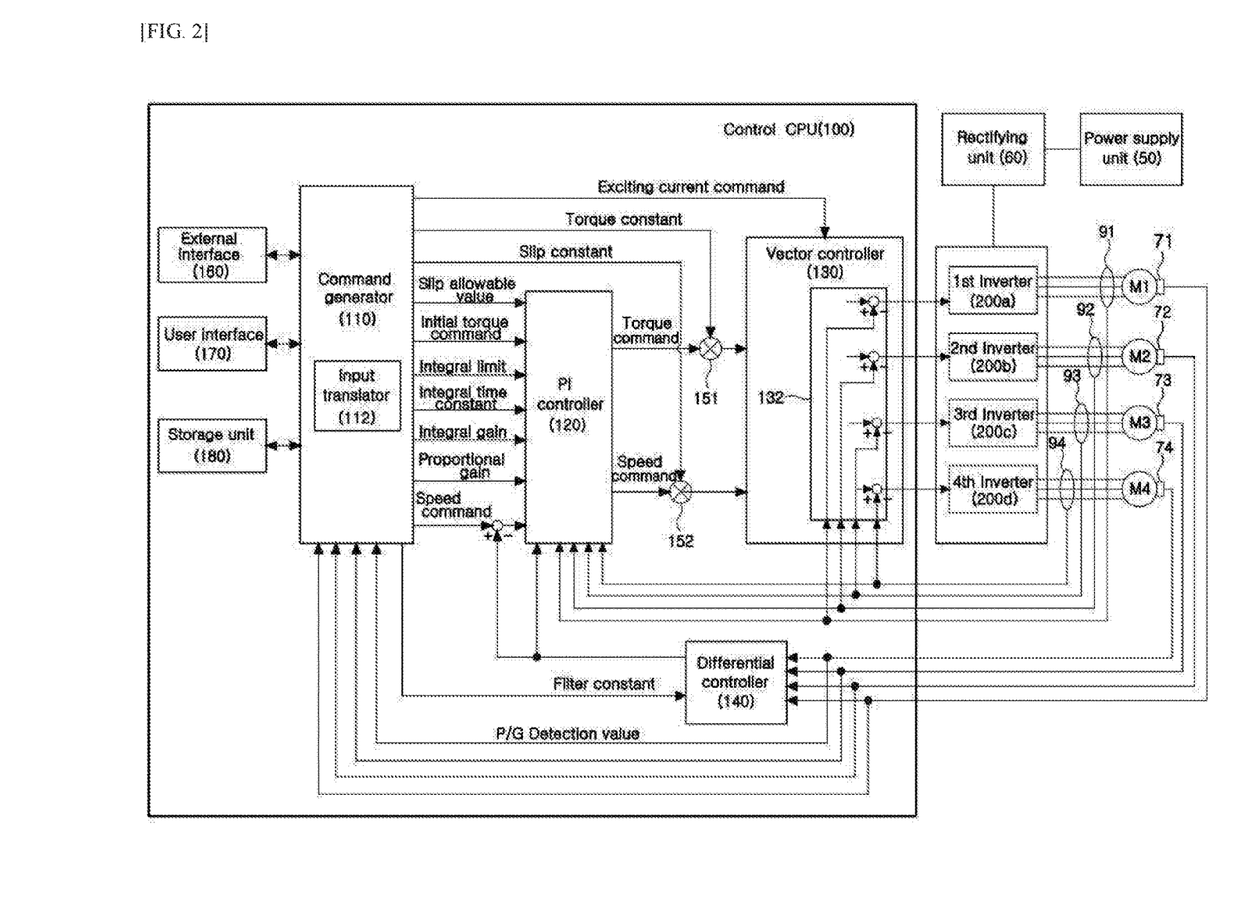
FIG. 2 is a diagram illustrating a configuration of a control CPU in more detail.

Hereinafter, a configuration of the control CPU 100 will be described in detail with reference to FIG. 2.

The control CPU 100 includes a command generator 110, a PI controller 120, a vector controller 130, a differential controller 140, an external interface 160, a user interface 170, a storage unit 180, and the like.

The control CPU 100 may be configured by one semiconductor chip, and functions of the command generator 110, the PI controller 120, the vector controller 130, the differential controller 140, first and second comparators 151 and 152 to be described below, and the like may be implemented by a control program executed by the control CPU 100.

The command generator 110 serves to transfer a command input through the external interface 160 or the user interface 170 to the PI controller 120, the vector controller 130, the differential controller 140, and the like.

In detail, the command generator 110 transmits an exciting current command to the vector controller 130, transmits a torque constant to the first comparator 151, and transmits a slip constant to the second comparator 152.

The first comparator 151 compares the torque constant transmitted from the command generator 110 with the torque command output from the PI controller 120 and transmits the result values to the vector controller 130. The second comparator 152 compares the slip constant transmitted from the command generator 110 with the speed command output from the PI controller 120 and transmits the result values to the vector controller 130.

Further, the command generator 110 transmits control parameters, such as a slip allowable value, an initial torque command, an integral limit, an integral time constant, an integral gain, a proportional gain, and a speed command, to the PI controller 120. Further, the command generator 110 transmits a filter constant to the differential controller 140.

These control parameters transmitted from the command generator 110 are determined by considering a capacity, load, a torque range, etc. of each of the motors M1, M2, M3, and M4 when the motor control device is initially tuned. And these control parameters may be input through the user interface 170 to be stored in the storage unit 180.

The control parameters transmitted from the command generator 110 will be described in detail as follows.

The exciting current command is a constant representing a current value supplied for generating a magnetic field in each of the motors M1, M2, M3, and M4, the torque constant is a constant representing a maximum current value supplied to each of the motors M1, M2, M3, and M4, and the slip constant is a constant representing a slip amount of each of the motors M1, M2, M3, and M4.

The slip allowable value means a range that allows the slip of the motor according to external load. When the slip allowable value is large, a smooth operation is possible, but a response characteristic is slow, and when the slip allowable value is small, the response characteristic is fast, but the smooth operation is difficult. Thus, an appropriate value needs to be set by considering a characteristic and a use of the motor in advance.

The initial torque command is a value that specifies the torque to be exhibited by each of the motors M1, M2, M3, and M4 at the beginning of the operation and for example, may be set as a ratio to the maximum torque.

The PI controller 120 controls the torque of each of the motors M1, M2, M3, and M4 by setting the initial torque command transmitted from the command generator 110 as a target torque value at the beginning of the operation, performs torque correction as described below when a predetermined time elapses or a predetermined condition is satisfied, and transmits the corrected torque command to the vector controller 130 to exhibit optimal torque against the load.

The integral limit is an upper limit value for preventing generation of excessive data at the time of torque control and the integral time constant is a filter value to prevent a rapid change from occurring at the time of torque control.

The integral gain is a value that gives the correction amount at the time of integrating a frequency (or speed) deviation of the feedback signal output from each of the pulse generators 71, 72, 73, and 74, and the proportional gain is a value that is given for preventing hutting of the motor in proportional to the frequency (or speed) deviation of the feedback signal output from each of the pulse generators 71, 72, 73, and 74.

The speed command is a target speed value that specifies the speed to be actually exhibited by each of the motors M1, M2, M3, and M4 and may be generated according to the command input through the user interface 170 or generated according to the command input through the external interface 160.

The filter constant is a time constant used when the differential controller 140 calculates the speed by using the feedback frequency signal output from each of the pulse generators 71, 72, 73, and 74 and may be set differently according to a capacity and an individual characteristic for each motor.

Meanwhile, in the exemplary embodiment of the present invention, the command generator 110 includes an input translator 112, and the input translator 112 serves to convert the command input through the external interface 160 or the user interface 170 into control commands or control parameters for the control operation executed in the PI controller 120, the vector controller 130, the differential controller 140, and the like.

Since the PI controller 120, the vector controller 130, the differential controller 140, and the like perform the control operation by a unique program of a CPU manufacturer, it is very difficult for the user to input or set directly the parameters and in many cases, it is incompatible with the control program of the external device.

The input translator 112 provides a user-friendly command language system (hereinafter, referred to as 'QMCL: Quick Motion Control language') to solve the problem and when the user inputs directly a QMCL command through the user interface 160, the input translator 112 translates the QMCL command into a unique programming language of the CPU manufacturer to transmit the translated command to the PI controller 120, the vector controller 130, the differential controller 140, and the like.

Accordingly, since the setting or the change of the control parameters is simplified from the viewpoint of the user or the researchers, it is possible to conveniently test the performance of each of the motors M1, M2, M3, and M4 in various ways.

Further, even when designing a control program of a main controller of electric vehicles, multi-axis robots, multi-axis machines, etc., the QMCL may be used, and thus, even though research developers of each device have no expertise for motor control programs, there is an advantage that it is very easy to link the main controller of the device and the control CPU 100. The system and the application of the QMCL command provided by the input translator 112 will be described below.

The PI controller 120 serves to generate a speed command and a torque command for controlling the speed and the torque of each of the motors M1, M2, M3, and M4 by performing a proportional integral control operation to transmit the generated commands to the vector controller 130.

In the exemplary embodiment of the present invention, for more accurate torque control and speed control, the PI controller 120 periodically corrects the torque command and the speed command by applying a new control method. As a result, each of the motors M1, M2, M3, and M4 exhibits the optimal torque in response to a load change, therefore it is possible to achieve effects of improvement of safety, power consumption reduction, prevention of overheating, and more precise speed control, and the like.

Figure 3:
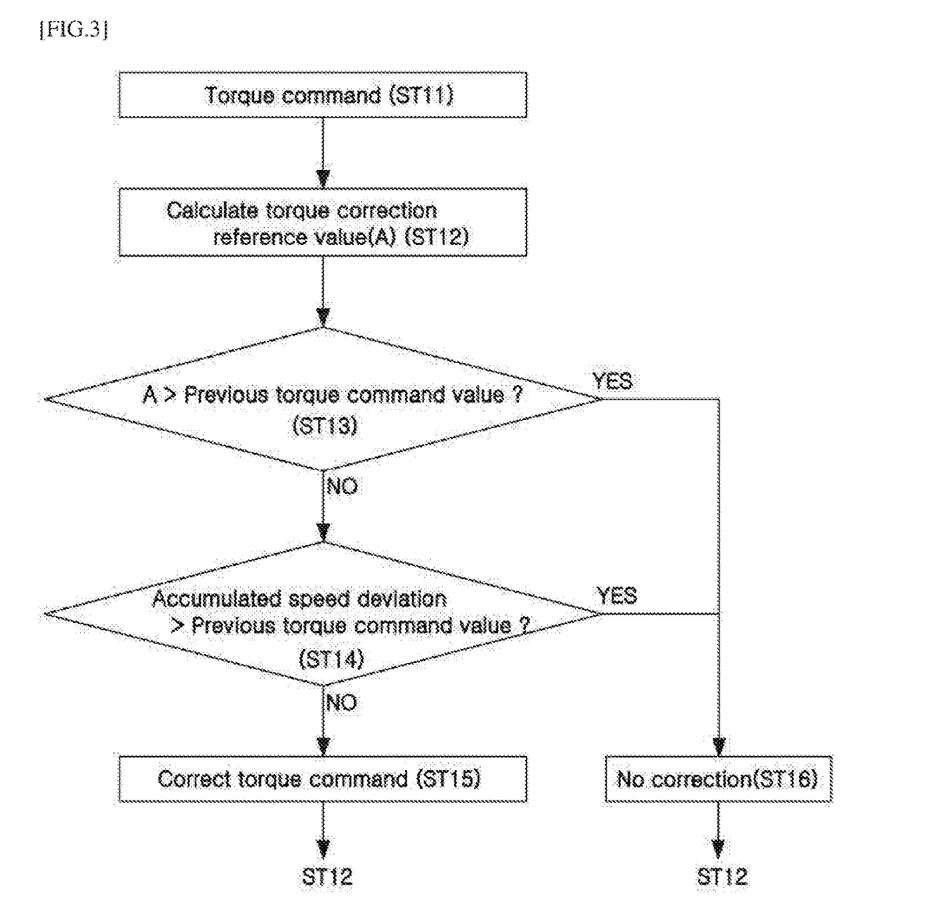
FIG. 3 is a flowchart illustrating a method of controlling torque according to an exemplary embodiment of the present invention.

A method of torque control performed in the PI controller 120 will be described with reference to a flowchart of FIG. 3.

First, the PI controller 120 sets the initial torque command transmitted from the command generator 110 as a target torque vale at the beginning of the operation and generates the torque command corresponding thereto to transmit the generated torque command to the vector controller 130 (ST11).

As such, after the initial torque command is transmitted to the vector controller 130, when the predetermined time elapses or the predetermined condition is satisfied, the PI controller 120 corrects a previous torque command value by using speed information and/or current information feed-backed from each of the pulse generators 71, 72, 73, and 74 and the current sensors 91, 92, 93, and 94 and outputs the corrected torque command to transmit the output torque command to the vector controller 130.

In particular, in the exemplary embodiment of the present invention, the PI controller 120 periodically calculates a torque correction reference value A using the speed deviation of each of the motors M1, M2, M3 and M4 and determines whether to correct the previous torque command value by using the calculated torque correction reference value A.

In detail, the PI controller 120 periodically calculates a torque correction reference value A of each of the motors M1, M2, M3 and M4 by using the following Equation 1.

$$A = \frac{K_i}{C_1}e(t) + \frac{K_p}{C_2}\sum_0^t e(t) \qquad \text{[Equation 1]}$$

Herein, $K_i$ and $K_p$ represent an integral gain and a proportional gain, respectively, and $C_1$ and $C_2$ are constants experimentally determined according to a characteristic of the motor. Further, e(t) is a speed deviation of the motor and means a value obtained by subtracting the speed value feed-backed through the pulse generators 71, 72, 73, and 74 from the speed command value.

The speed value feed-backed through the pulse generators 71, 72, 73, and 74 is calculated in the differential controller 140 to be transmitted to the PI controller 120.

Σe(t) is an accumulated speed deviation of the motor and calculated by using the following Equation 2 in the exemplary embodiment of the present invention (ST12).

$$\sum_0^t e(t) = \sum_0^{t-1} e(t) + \frac{e(t)}{\text{Integral time constant}} \qquad \text{[Equation 2]}$$

Then, the PI controller 120 compares the calculated torque correction reference value A with the previous torque command value. Herein, the previous torque command value means a command value that is calculated by the PI controller 120 by using an exciting current command value, a torque constant, an initial torque command value, and the like to be transmitted to the vector controller 130 (ST13).

In step ST13, when the torque correction reference value A is smaller than or equal to the previous torque command value, the accumulated speed deviation Σe(t) of the motor is compared with the previous torque command value (ST14).

In step ST14, when Σe(t) is smaller than or equal to the previous torque command value, the correction of increasing or decreasing the previous torque command value in a predetermined range is performed and the corrected new torque command is transmitted to the vector controller 130. Herein, whether to increase or decrease the torque command value is determined by using information on the speed and/or the load.

As such, when the corrected new torque command is transmitted to the vector controller 130, a duty ratio of the PWM signal applied to the motors M1, M2, M3 and M4 is changed and thus, the torque of the motor is changed (ST15).

Meanwhile, in step ST13, when the torque correction reference value A is larger than the previous torque command value, the previous torque command value is not corrected, but transmitted to the vector controller 130 as it is to maintain the current torque.

Further, in step ST14, when Σe(t) is larger than the previous torque command value, the previous torque command value is not corrected, but transmitted to the vector controller 130 as it is to maintain the current torque (ST16).

Meanwhile, generally, since the torque of the motor is proportional to the intensity of the applied current, the PI controller 120 basically performs the proportional integral control operation by feed-backing a detection value of each of the current sensors 91, 92, 93, and 94.

According to the torque control method of the exemplary embodiment of the present invention, the torque may be controlled in real time in connection with the speed by adjusting torque control parameters using a deviation between the speed feed-backed through the pulse generators 71, 72, 73, and 74 and the speed command value. As a result, there is an advantage that each of the motors M1, M2, M3 and M4 may exhibit stable torque at a predetermined speed.

Figure 4:
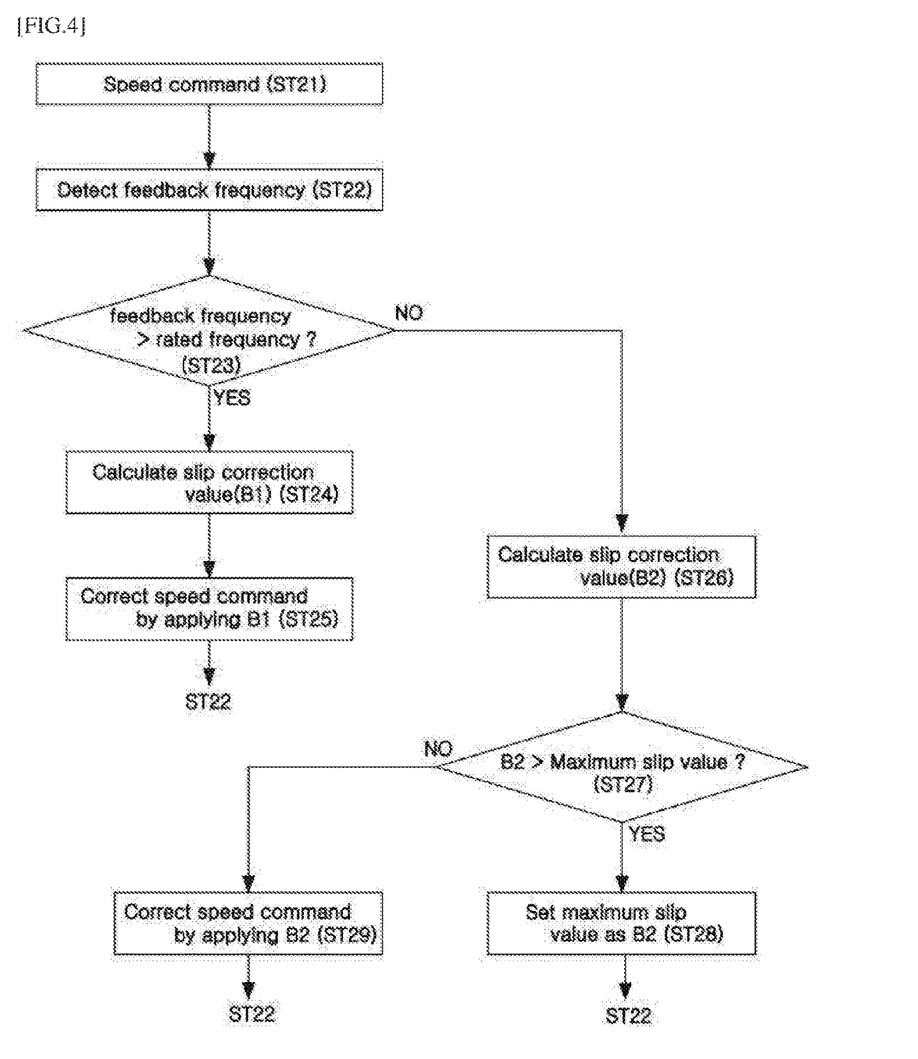
FIG. 4 is a flowchart illustrating a method of controlling a speed according to an exemplary embodiment of the present invention.

Next, a method of controlling a speed performed in the PI controller 120 will be described with reference to a flowchart of FIG. 4.

First, the PI controller 120 transmits the speed command transmitted from the command generator 110 to the vector controller 130 as it is at the beginning of operation. After the feedback information is input, the PI controller 120 periodically corrects the speed command by the proportional integral operation to transmit the corrected speed command to the vector controller 130.

The following Equation 3 represents a method of calculating a speed command by the PI controller 120 according to the exemplary embodiment of the present invention, and the first term and the second term represent a generally used proportional term and an integral term, and the third term represents a slip correction value B.

$$V(t) = K_p e(t) + K_i \int_0^t e(t) + B \quad \text{[Equation 3]}$$

The slip correction value B is added for correcting the speed command by considering the slip of the motor. The e(t) is a speed deviation of the motor and means a value obtained by subtracting the speed value feed-backed through the pulse generators 71, 72, 73, and 74 from the speed command value (ST21).

In order to periodically calculate the speed command V(t), first, the PI controller 120 periodically detects a feedback frequency $f_F(t)$ of each of the motors M1, M2, M3 and M4 through the pulse generators 71, 72, 73, and 74 (ST22).

In addition, the feedback frequency $f_F(t)$ is compared with a rated frequency $f_R$ of each of the motors M1, M2, M3 and M4 (ST23).

In step ST23, when the feedback frequency $f_F(t)$ is larger than the rated frequency $f_R$, the speed is controlled by calculating a slip correction value B 1 by the following Equation 4 and substituting B 1 for B of the above Equation 3.

$$B_1 = \frac{1}{C_3}\left(S_{maxL} \times S_{HIGH} \times \frac{f_F(t) - f_R}{f_F(t)}\right) + S_{maxL} \quad \text{[Equation 4]}$$

Herein, $S_{maxL}$ is a slip value when the motor is at the maximum load at the rated frequency $f_R$, $S_{HIGH}$ is a rising slip value when the feedback frequency of the motor is larger than the rated frequency $f_R$, and $C_3$ is a constant determined experimentally according to a characteristic of the motor (ST24 and ST25).

Meanwhile, in step ST23, when the feedback frequency $f_F(t)$ is smaller than or equal to the rated frequency $f_R$, a slip correction value B2 is calculated by the following Equation 5.

$$B_2 = \frac{S_{maxL}}{C_4} \times \left\{(C_5 - So) \times \frac{f_F(t)}{f_R} + So\right\} \quad \text{[Equation 5]}$$

Herein, So is a slip value when the motor is stopped while the power is supplied, and $C_4$ and $C_5$ are constants determined experimentally according to a characteristic of the motor.

After calculating the slip correction value B2 in this manner, the slip correction value B2 is compared with the maximum slip value of the motor (ST27).

In step ST27, when the slip correction value B2 is larger than the maximum slip value of the motor, the speed control is performed by substituting the maximum slip value for the slip correction value B of Equation 3 (ST28).

If in step ST27, the slip correction value B2 is smaller than or equal to the maximum slip value of the motor, the speed control is performed by substituting the calculated slip correction value B2 for B of Equation 3 (ST29).

In the exemplary embodiment of the present invention, the speed is controlled by considering various slip values of the motor as described above and thus, particularly, even when the motor is operating at a high speed or requires large torque, there is an advantage that the speed may be stably controlled.

The torque command and the speed command calculated in the PI controller 120 through the processes described above are transmitted to the vector controller 130 through the first comparator 151 and the second comparator 152, respectively.

The first comparator 151 compares the calculated torque command with the torque constant to transmit values in the torque constant to the vector controller 130 and as a result, the current supplied to each of the motors M1, M2, M3 and M4 is limited so as not to exceed the maximum current.

The second comparator 152 compares the speed command with the slip constant to transmit the corrected speed command to the vector controller 130.

The vector controller 130 includes a PMW generator 132 and performs a vector control operation by using the torque command and the speed command that are calculated in the PI controller 120 and input through the first comparator 151 and the second comparator 152, respectively, and the PMW generator 132 outputs a PWM signal. The output PWM signal is supplied to each switching element of the invertors 200a, 200b, 200c, and 200d.

The PMW generator 132 may generate the a PWM signal by using the result value of the vector control operation and the current value feed-backed from each of the current sensors 91, 92, 93, and 94.

The differential controller 140 calculates the speed of each of the motors M1, M2, M3, and M4 by using the feed-backed pulse through the pulse generators 71, 72, 73, and 74 and in the calculating process, the filter constant transmitted from the command generator 110 is used.

The external interface 160 supports communication with a main controller of, for example, a multi-axis machine, a multi-axis robot, an electric vehicle, etc. The user interface 170 supports input and output through an input means (a keyboard, a button, a touch screen, etc.), a display, a speaker, and the like.

The storage unit 180 stores information such as the control program performing the motor control according to the exemplary embodiment of the present invention and the control parameters input by the user interface 170 or the external interface 160. Although the storage unit 180 is provided inside the control CPU 100 in the drawing, the storage unit 180 is not necessarily limited thereto, and the storage unit 180 may be separately provided outside the control CPU 100.

Hereinafter, the QMCL command and its application provided by the input translator 112 will be briefly described.

TABLE 1

| Description of Command | Motor(M1) | Motor(M2) | Motor(M3) | Motor(M4) |
|---|---|---|---|---|
| Command Frequency | HZP1 | HZP2 | HZP3 | HZP4 |
| Current Frequency | HZS1 | HZS2 | HZS3 | HZS4 |
| Low-Speed Torque | VFB1 | VFB2 | VFB3 | VFB4 |
| High-Speed Torque | VFA1 | VFA2 | VFA3 | VFA4 |
| Target Pulse | POS1 | POS2 | POS3 | POS4 |
| Current Pulse | PLS1 | PLS2 | PLS3 | PLS4 |
| Maximum Speed | MAXHz1 | MAXHz2 | MAXHz3 | MAXHz4 |
| Minimum Speed | MINHz1 | MINHz2 | MINHz3 | MINHz4 |
| Deceleration Slope | PSG1 | PSG2 | PSG3 | PSG4 |
| Acceleration Slope | SFT1 | SFT2 | SFT3 | SFT4 |

Table 1 above exemplifies QMCL commands provided by the input translator 112, and when the commands are used, different commands may be briefly given for each of several motors M1, M2, M3, and M4, and thus, there is an advantage that it is very easy for a user or a researcher to set or input required control commands.

Meanwhile, the type of QMCL command is not limited thereto, and for example, may include various commands such as a register memory, an input/output command, a communication command, an indication command for such as a 7-segment command, a hexadecimal/decimal designation command, an operation command, a logic command, a memory access command, a timer command, a condition setting command, and the like.

Figure 5:
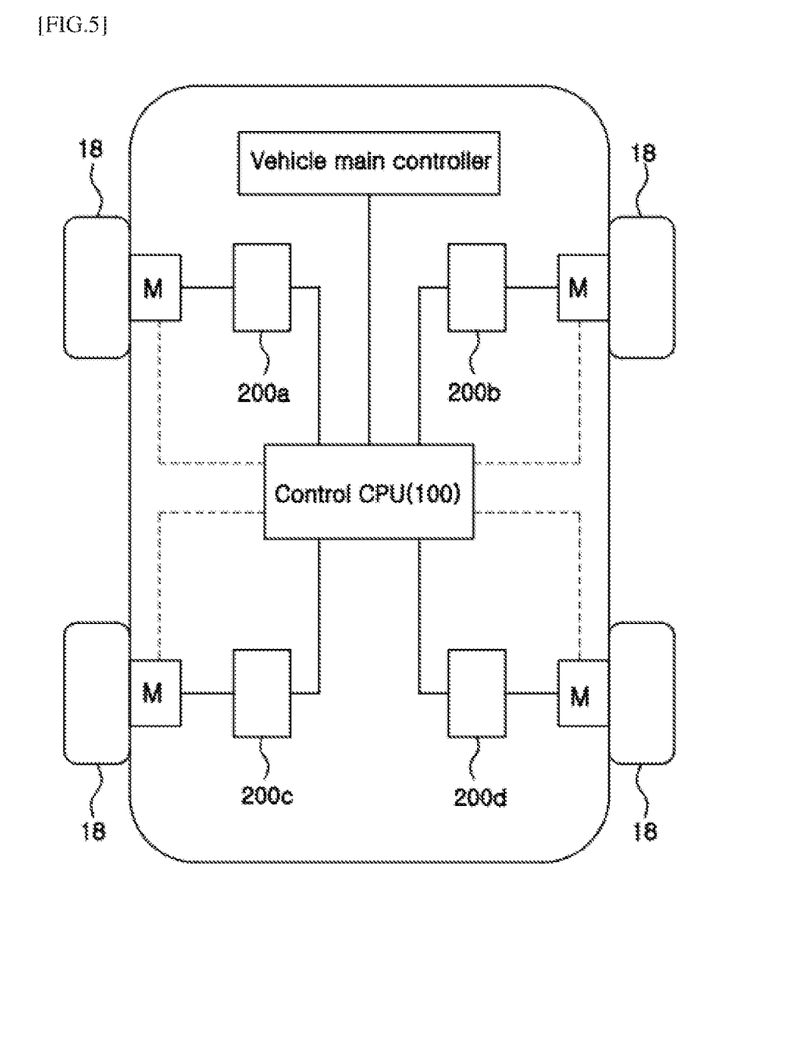
FIG. 5 is a schematic configuration diagram illustrating an electric vehicle comprising a motor control device according to an exemplary embodiment of the present invention.

Meanwhile, FIG. 5 illustrates an application example of the motor control device according to an exemplary embodiment of the present invention, and illustrates a control system of an independent-drive electric vehicle.

As illustrated in FIG. 5, an independent-drive electric vehicle includes several motors M mounted on each wheel 18 one by one, a control CPU 100 which independently controls several motors M, a vehicle main controller 11 providing a control command to the control CPU 100, and a plurality of inverters 200a, 200b, 200c and 200d supplying power to each motor M under the control of the control CPU 100.

When a driver operates an accelerator, a brake, a gear, or the like, the vehicle main controller 11 generates a control signal corresponding thereto to transmit the control signal to the control CPU 100. Further, when the vehicle main controller 11 includes a vehicle safety automatic control system such as an anti-lock brake system (ABS), a traction control system (TCS), and an electronic stability program (ESP) or interworks with the vehicle safety automatic control system, the vehicle main controller 11 transmits control signals generated in these systems to the control CPU 100.

Such an independent-drive electric vehicle does not need to use components such as a differential gear, a transfer case, and a power transmission shaft, thereby reducing the power loss ratio, facilitating maintenance, and improving the freedom of design of the vehicle by securing available space.

In the drawing, it is illustrated that the motor M is mounted for each of the four wheels 18, but in the case of a front-wheel drive or rear-wheel drive electric vehicle, of course, only the two wheels 18 are mounted on the motor M.

The following Examples exemplify a control algorithm created using the aforementioned QMCL command for controlling an electric vehicle mounted with two motors, and even if a special programming language for motor control is not known, it is very easy to create a control algorithm.

EXAMPLE 1

| | |
|---|---|
| 001 | SEVCC = 1 |
| 002 | HZP1 = 100 |
| 003 | HZP2 = 150 |
| 004 | VFB1 = 50 |
| 005 | VFB2 = 80 |

Figure 6A:
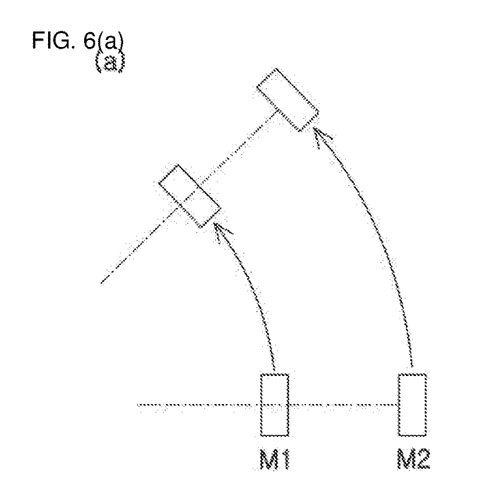
FIGS. 6(a) and 6(b) are diagrams illustrating various application examples of commands for controlling the motor according to an exemplary embodiment of the present invention.

The control algorithm consisting of the above five codes is an operation command that for example, the motor 1 is operated at 50% of the maximum torque at 100 rpm and the motor 2 is operated at 80% of the maximum torque at 150 rpm. When each motor operates according to such an operation command, the vehicle performs the turning motion as illustrated in FIG. 6 (a), and the turning motion is stably performed without a differential gear.

EXAMPLE 2

| | |
|---|---|
| 001 | SECVCC = 1 |
| 002 | PLS1 = 10,000 |
| 003 | PLS2 = 10,000 |
| 004 | POS1 = 20,000 |
| 005 | POS2 = 30,000 |
| 006 | PSG1 = 20 |
| 007 | PSG2 = 100 |

Figure 6B:
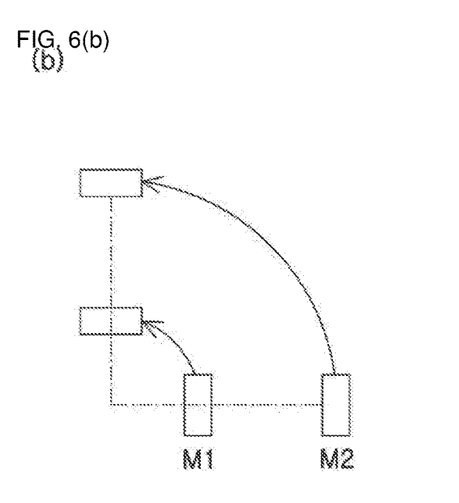

When it is assumed that the number of pulses per revolution of the pulse generator is 10,000, the control algorithm consisting of the above seven codes is an operation command for the motor 1 to make one revolution at the deceleration slope of 20 and the motor 2 to make two revolutions at the deceleration slope of 100. When each motor operates according to the operation command, the vehicle performs a 90° turning motion as illustrated in FIG. 6 (b), and this function may be usefully applied when the vehicle is parked at a right angle.

Hereinabove, the preferred exemplary embodiments of the present invention are described, but the scope of the present invention is not limited thereto and may be variously modified or corrected in a specific application process.

As an example, hereinabove, it is described that the control CPU 100 feedbacks the detection values of the pulse generators 71, 72, 73, and 74 mounted for each of the four motors M1, M2, M3, and M4 to perform a sensor feedback vector control, and even in the case of performing a sensorless vector control without using the pulse generators 71, 72, 73, and 74, the present invention may be applied.

As another example, in this specification, it is described that the control CPU 100 controls the four motors M1, M2, M3 and M4, but of course, the number of motors that may be controlled by the control CPU 100 is not limited thereto.

As yet another example, in this specification, it is described that the control CPU 100 controls the motor mounted on the wheel in the case where the control CPU 100 is used in the independent-drive vehicle, but the control CPU 100 may control motors for other purposes such as a power steering motor in addition to the motor for the wheel.

As described above, the present invention may be variously modified or corrected in the specific application process, and of course, if the modified or corrected exemplary embodiments are also included in the technical spirit of the present invention disclosed in the following claims, the modified or corrected exemplary embodiments are included in the scope of the present invention.

[Explanation of Reference Numerals]

| | |
|---|---|
| 50: Power supply unit | 52: Power conversion unit |
| 60: Rectifying unit | 71, 72, 73, 74: Pulse generator |
| 91, 92, 93, 94: Current sensor | 100: Control CPU |
| 110: Command generator | 112: Input translator |
| 120: PI controller | 130: Vector controller |
| 132: PWM signal generator | 140: Differential controller |
| 151: First comparator | 152: Second comparator |
| 160: External interface | 170: User interface |
| 180: Storage unit | |
| 200a, 200b, 200c, 200d: First, second, third, and fourth inverters | |

The invention claimed is:

1. A motor control device controlling several motors independently, the motor control device comprising:
   a processor;
   a storage storing a control program executable by the processor; and
   a plurality of inverters supplying power to each of several motors, respectively,
   wherein the processor generates a control command, generates a torque command and a speed command by performing a proportional integral operation using feedback information and the control command, generates a PWM control signal using the torque command and the speed command and supplies the generated PWM signal to the plurality of inverters,
   wherein the processor calculates a torque correction reference value A for each of several motors by using the following Equation, does not correct the torque command when the torque correction reference value A is larger than a previous torque command value, and corrects the torque command when the torque correction reference value A is smaller than or equal to the previous torque command value, $$A = \frac{K_i}{C_1}e(t) + \frac{K_p}{C_2}\sum_0^t e(t)$$

($K_i$: integral gain, $K_p$: proportional gain, $C_1$, $C_2$: constant, $e(t)$: speed deviation of motor, $\Sigma e(t)$: accumulated speed deviation of motor).

2. The motor control device of claim 1, wherein the accumulated speed deviation is calculated by using the following Equation, and in the case that the torque correction reference value A is smaller than or equal to the previous torque command value, the processor does not correct the torque command when the accumulated speed deviation is larger than the previous torque command value, and corrects the torque command when the accumulated speed deviation is smaller than or equal to the previous torque command value, $$\sum_0^t e(t) = \sum_0^{t-1} e(t) + \frac{e(t)}{\text{Integral time constant}}.$$

3. The motor control device of claim 1, wherein the processor corrects the speed command by using a slip correction value B1 calculated by using a product of a slip value $S_{maxL}$ of each motor in a maximum load at a rated frequency $f_R$ and a rising slip value $S_{HIGH}$ of each motor when the feedback frequency is larger than the rated frequency $f_R$ in the case that a feedback frequency $f_F(t)$ of each motor is larger than the rated frequency $f_R$ of each motor.

4. The motor control device of claim 3, wherein the slip correction value B1 is calculated by using the following Equation, $$B_1 = \frac{1}{C_3}\left(S_{maxL} \times S_{HIGH} \times \frac{f_F(t) - f_R}{f_F(t)}\right) + S_{maxL}$$

$S_{maxL}$: slip value of motor in maximum load at rated frequency $f_R$ $S_{HIGH}$: rising slip value when feedback frequency of motor is larger than rated frequency $f_R$ $C_3$: constant.

5. The motor control device of claim 1, wherein the processor calculates a slip correction value B2 by using a slip value $S_{maxL}$ of each motor in a maximum load at a rated frequency $f_R$ and a slip value So of each motor when the motor is stopped while power is supplied, in the case that a feedback frequency $f_F(t)$ of several motors is smaller than or equal to the rated frequency $f_R$ of each motor,
   and wherein the processor corrects the speed command by using the slip correction value B2 when the slip correction value B2 is smaller than or equal to the maximum slip value of each motor and corrects the speed command by using the maximum slip value when the slip correction value B2 is larger than the maximum slip value of each motor.

6. The motor control device of claim 5, wherein the slip correction value B2 is calculated by using the following Equation, $$B_2 = \frac{S_{maxL}}{C_4} \times \left\{(C_5 - So) \times \frac{f_F(t)}{f_R} + So\right\}$$

$S_{maxL}$: slip value of motor in maximum load at rated frequency $f_R$

So: slip value when motor is stopped while power is supplied $C_4$, $C_5$: constants.

7. A motor control device controlling several motors independently, the motor control device comprising:
a processor;
a storage storing a control program executable by the processor; and
a plurality of inverters supplying power to each of several motors, respectively,
wherein the processor generates a control command, generates a torque command and a speed command by performing a proportional integral operation using feedback information and the control command, generates a PWM control signal using the torque command and the speed command and supplies the generated PWM signal to the plurality of inverters,
wherein the processor corrects the speed command by using a slip correction value B1 calculated by using a product of a slip value $S_{maxL}$ of each motor in a maximum load at a rated frequency $f_R$ and a rising slip value $S_{HIGH}$ of each motor when the feedback frequency is larger than the rated frequency $f_R$ in the case that a feedback frequency $f_F(t)$ of each motor is larger than the rated frequency $f_R$ of each motor.

8. The motor control device of claim 7, wherein the slip correction value B1 is calculated by using the following Equation, $$B_1 = \frac{1}{C_3}\left(S_{maxL} \times S_{HIGH} \times \frac{f_F(t) - f_R}{f_F(t)}\right) + S_{maxL}$$

$S_{maxL}$: slip value of motor in maximum load at rated frequency $f_R$ $S_{HIGH}$: rising slip value when feedback frequency of motor is larger than rated frequency $f_R$ $C_3$: constant.

9. A motor control device controlling several motors independently, the motor control device comprising:
a processor;
a storage storing a control program executable by the processor; and
a plurality of inverters supplying power to each of several motors, respectively,
wherein the processor generates a control command, generates a torque command and a speed command by performing a proportional integral operation using feedback information and the control command, generates a PWM control signal using the torque command and the speed command and supplies the generated PWM signal to the plurality of inverters,
wherein the processor calculates a slip correction value B2 by using a slip value $S_{maxL}$ of each motor in a maximum load at a rated frequency $f_R$ and a slip value So of each motor when the motor is stopped while power is supplied, in the case that a feedback frequency $f_F(t)$ of several motors is smaller than or equal to the rated frequency $f_R$ of the motor,
and wherein the processor corrects the speed command by using the slip correction value B2 when the slip correction value B2 is smaller than or equal to the maximum slip value of the motor and corrects the speed command by using the maximum slip value when the slip correction value B2 is larger than the maximum slip value of each motor.

10. The motor control device of claim 9, wherein the slip correction value B2 is calculated by using the following Equation, $$B_2 = \frac{S_{maxL}}{C_4} \times \left\{(C_5 - So) \times \frac{f_F(t)}{f_R} + So\right\}$$

$S_{maxL}$: slip value of motor in maximum load at rated frequency $f_R$

So: slip value when motor is stopped while power is supplied $C_4$, $C_5$: constants.

11. The motor control device of claim 1, wherein the processor converts an input command into the control command.

12. The motor control device of claim 1, wherein the feedback information includes output current information of each inverter and speed information calculated by a differential controller by using a pulse generated in a pulse generator mounted on each motor.

* * * * *